United States Patent Office — 3,718,504 — Patented Feb. 27, 1973

3,718,504
PROCESS FOR EXTRACTING SUGARS
FROM CATTLE MANURE
Barron S. Whittingham, Culver City, Calif., assignor to
Feed Recycling Co., Ripley, Calif.
No Drawing. Continuation-in-part of application Ser. No.
111,751, Feb. 1, 1971. This application June 12, 1972,
Ser. No. 261,795
Int. Cl. C13k 1/02
U.S. Cl. 127—37                                    8 Claims

ABSTRACT OF THE DISCLOSURE

Process for extracting sugars from the cellulosic residue of cattle manure. The manure is first treated to remove protein and proteinaceous compounds. The cellulosic residue is then treated in water with sulphur dioxide ($SO_2$), or sodium hydrosulfite ($Na_2S_2O_4$), which acts as a reducing agent, and it is then subjected to an acid hydrolysis reaction to convert to sugars, after which the sugars are removed

BACKGROUND OF THE INVENTION

This application is a continuation-in-part of copending application Ser. No. 111,751, filed Feb. 1, 1971, now abandoned.

Copending application Ser. No. 111,761, filed Feb 1, 1971, describes a floatation process whereby proteins and proteinaceous compounds may be removed from cattle manure. The process of the present invention may be applied to the cellulosic residue after the process of the copending application Ser. No. 111,761 has been carried out, so that sugars may be recovered therefrom.

As mentioned in the copending application Ser. No. 111,761, the tons of cattle manure produced daily at feeding and fattening pens present environmental problems. This is because the manure tends to attract disease-bearing insects, and it also creates noxious odors during its decaying and fermenting period. Since cattle manure has very limited fertilizing capabilities, it has no practical utility, even in farming areas.

The process described in the copending application Ser. No. 111,761 serves to extract proteins and proteinaceous compositions from dry or wet cattle manure. The proteins derived by the process of the patent are reusable by incorporation into regular cattle feed, and this constituted an economical means for supplying the nitrogenous requirements of the cattle. The sugars extracted from the cellulosic residue by the process of the present invention are likewise reusable. In addition, the processes of the copending application Ser. No. 111,761 and of the present invention help solve ecological and environmental problems, in that they present a simple and expeditious means for reducing cattle manure to a state in which it no longer attracts flies, and in which it does not have a noxious odor. The residual cellulosic fibers present after sugar extraction may be reduced to furfural. The remaining fibers are also suitable for the production of high porosity carbon black.

In carrying out the protein-extraction process described in the copending application Ser. No. 111,761, and as more fully described therein, wet or dry manure is mixed with an aqueous solution of 0.4% sodium chloride, in which 0.4% ammonium sulfate is dissolved. The mixture is agitated and stirred in air. The proteins from the manure float to the surface of the mixture as froth in from 1–5 minutes after the agitation has been stopped; or on a continuous basis in appropriate apparatus. The froth may then be removed mechanically, and it may then be liquefied and dried.

In a particular example described in the copending application Ser. No. 111,761, the basic protein extracting solution is made by dissolving four grams of sodium chloride in 1,000 cc. water, and by then adding 100–400 grams of manure and 4 grams of ammonium sulfate to 500 cc. of the sodium chloride solution. The resulting mixture is stirred at a minimum of 1750 revolutions per minute to introduce air into the mixture. The stirring is continued for three minutes and then terminated. Within two minutes thereafter, the protein froth will surface, and may be removed by any appropriate mechanical means. The aforesaid process is repeated until no further froth forms from the mixture. The protein as froth may be produced on a continuous basis on the surface of the liquid by the use of floatation cells. This froth later collapses to a liquid state.

The resulting protein free cellulosic residue may now be treated in accordance with the process of the present invention to recover sugars. The cellulosic residue usually consists of indigested grains, starches and vegetable fibers. The starches, grains and vegetable fibers may be hydrolyzed or partially degraded by enzymes, bacteria and natural juices endogenous to the digestive processes.

The extraction of sugars from starches and complex carbohydrates by acid hydrolysis is known to the art. However, in the process of the present invention the acid hydrolysis of the aforesaid cellulosic residue produces a vastly increased sugar yield. For example, it has been found that acid hydrolysis of the residue will normally yield sugars of the order to 3%–5% by weight of the dried residue. However, when the residue is processed by the action of the present invention, the sugar yield increases by the order of 12% to 15%.

The objectives of the present invention, therefore, are to provide an improved method and process for the production of reusable sugars from the cellulosic residue of cattle manure after the proteins and proteinaceous compositions have been removed, and to incorporate an action so as to optimize the sugar yield.

DESCRIPTION OF THE PROCESS OF THE INVENTION

In the process of the invention, in one of its embodiments, the cellulosic residue is treated in water with sulphur dioxide ($SO_2$) for from 30–60 minutes at ambient temperature, after which the material is subjected to an acid hydrolysis action for from 60–120 minutes to convert it to sugars. In the process, sulphurous acid ($H_2SO_3$) is formed from the sulphur dioxide ($SO_2$), which acts as a reducing agent on the starches and complex carbohydrates of the residue.

Sodium hydrosulfite ($Na_2S_2O_4$) may be used in place of the sulphur dioxide, and it also acts as a powerful acidic agent at ambient temperatures to increase the yield of sugars from the cellulosic residue complex, when the residue is subjected to the aforesaid acidic hydrolysis action. Although both the sulphur dioxide and sodium hydrosulfite acquire an acid reaction with water at ambient temperatures, the solubility of the sulphur dioxide ($SO_2$) is from 6% to 8% while the sodium hydrosulfite is highly soluble. The noxious odors of the residue are significantly reduced upon the incorporation of either of the aforesaid sulphur dioxide or sodium hydrosulfite.

After the acid hydrolysis of the residue, reusable sugars may be extracted. Appropriate tests have revealed the presence of glucose, mannose and galactose, with traces of pentose, in the recovered sugars.

Particular examples of the process of the invention are as follows:

EXAMPLE I

To 1500 cc. water add 500 grams protein-free manure residue and treat with 5–8 cc. sulphur dioxide ($SO_2$) for from 30-60 minutes at one atmosphere. After 60 minutes add 75 grams sulphuric acid and reflux for from 90-120 minutes. Treat the filtrate with calcium oxide or calcium hydroxide until a pH of 7.5-8 is reached. The addition of calcium ions react to remove the sulphuric acid as calcium sulphate. A further addition of a small amount of calcium ions beyond the stoichiometric requirements for acid removal will result in the required pH range of 7.5-8 before distillation. Then treat the filtrate with Darco G-60 to remove chromogenic material, then distill to a syrup and crystallize.

EXAMPLE II

To 3000 cc. water at ambient temperature add 2 grams sodium hydrosulfite ($Na_2S_2O_4$), 600 grams protein-free cattle manure residue and mix thoroughly. To this mixture add 150 grams sulphuric acid and reflux at 100° C. for 90 minutes. Clarify and crystallize the resulting filtrate by prior art steps, as in Example I.

When sulphur dioxide ($SO_2$) is incorporated in water with a ratio of 3 parts of water to 1 part of the cellulosic material derived from cattle manure, the reaction produces at once sulfurous acid ($H_2SO_3$) with a pH of from 2 to 3. Unlike the prior art practice of using a minimum of 5% sulfuric acid based on an aqueous volume, and a refluxing time at atmospheric pressure of from 3 to 8 hours to produce saccharification, the process of the present invention uses on the average of 2.5% sulfuric acid as an oxidizing agent, following the use of the sulfurous acid, will produce a higher percentage of reducing sugar.

Instead of refluxing at atmospheric pressure, it is preferred to carry out the process in a closed vessel, whereby the cellulosic material treated with the reducing reagent plus the oxidizing sulfuric acid is subjected to a pressure of from 5 to 10 pounds. When the process is carried out under such a pressure, for a time interval of 15 minutes, maximum conversion of the cellulosic compounds and starches to a higher percentage of sugars will result, so that economies may be effected both by the volumes of the oxidizing agents and the time required for the reflux.

It will be appreciated that while particular examples of the process of the invention have been described, modifications may be made. It is intended to cover such modifications in the following claims.

What is claimed is:

1. A process for extracting sugars from cattle manure comprising the steps:
   (a) removing protein and proteinaceous compounds from the manure,
   (b) forming a slurry of the protein-free manure with water and sulfur dioxide or sodium hydrosulfite,
   (c) adding an inorganic acid to the slurry to extract sugars therefrom by acidic hydrolysis action,
   (d) filtering the resulting mixture, and
   (e) crystallizing sugars from the resulting filtrate.

2. The process of claim 1, in which the filtrate resulting from step (d) is treated with calcium oxide or calcium hydroxide until a pH of 7.5-8 is reached prior to carrying out step (e).

3. The process of claim 1, in which the hydrolysis step (c) is carried out under pressure.

4. The process of claim 1, in which the hydrolysis step (c) is carried out under a pressure of from 5-10 pounds for a time interval of the order of 15 minutes.

5. The process of claim 1, in which the slurry of step (b) is formed by reacting 500 grams of protein-free manure in 1500 cc. of water with 5-8 cc. of sulfur dioxide from 30-60 minutes at one atmosphere.

6. The process of claim 5, in which the step (c) is carried out with 75 grams of sulfuric acid after 60 minutes and followed by a refluxing step extending from 90-120 minutes.

7. The process of claim 1, in which the slurry of step (b) is formed by mixing 600 grams of protein-free manure into 300 cc. of water containing 2 grams of sodium hydrosulfite.

8. The process of claim 7, in which the step (c) is carried out with 150 grams of sulfuric acid and step (d) is followed by refluxing at 100° C. for 90 minutes.

References Cited

UNITED STATES PATENTS

| | | | |
|---|---|---|---|
| 415,246 | 11/1889 | Hanselman | 71—21 |
| 526,338 | 9/1910 | Hoskins | 71—21 |
| 2,198,785 | 4/1940 | Mohr | 127—37 |
| 2,284,500 | 5/1942 | Warth | 127—37 |
| 2,790,790 | 4/1957 | Klostergaard | 260—122 |
| 3,050,383 | 8/1962 | Wilson | 71—21 X |
| 3,067,065 | 12/1962 | Kusama | 127—37 |
| 3,313,795 | 4/1967 | Rubin | 99—2 |
| 3,375,116 | 3/1968 | Anthony | 71—21 X |

MORRIS O. WOLK, Primary Examiner

S. MARANTZ, Assistant Examiner

U.S. Cl. X.R.

99—2R, 14; 127—38, 44; 260—112 R, 347.9; 423—445